US010927968B2

(12) United States Patent
Mulakala et al.

(10) Patent No.: US 10,927,968 B2
(45) Date of Patent: Feb. 23, 2021

(54) PNEUMATIC VALVE/PRESSURE VESSEL PLASTIC METAL COMPOSITE COVER WITH BAYONET RETENTION FEATURE

(71) Applicant: Bendix Commercial Vehicle Systems LLC, Elyria, OH (US)

(72) Inventors: Chandra Sekhar Mulakala, Maharashtra (IN); Venkateswararao Nakka, Maharashtra (IN); Brian J. Riley, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 190 days.

(21) Appl. No.: 16/217,082

(22) Filed: Dec. 12, 2018

(65) Prior Publication Data

US 2020/0191284 A1 Jun. 18, 2020

(51) Int. Cl.
*B65D 41/04* (2006.01)
*F16K 35/10* (2006.01)
*F16K 13/00* (2006.01)
*B65D 41/06* (2006.01)

(52) U.S. Cl.
CPC .......... *F16K 13/00* (2013.01); *B65D 41/0478* (2013.01); *B65D 41/06* (2013.01); *F16K 35/10* (2013.01)

(58) Field of Classification Search
CPC ... F16B 5/10; B65D 41/0471; B65D 41/0478; B65D 41/06; B65D 41/065; B65D 51/14; B65D 41/0492; B65D 55/00; B65D 55/022; B65D 55/04; F16K 35/10
USPC ..................... 251/366; 137/315.33
See application file for complete search history.

(56) References Cited

U.S. PATENT DOCUMENTS

| 2,765,183 | A | | 10/1956 | Mahoney | |
|---|---|---|---|---|---|
| 4,373,641 | A | * | 2/1983 | Banich, Sr. ............ | B65D 41/04 215/331 |
| 4,627,547 | A | * | 12/1986 | Cooke .................... | B65D 41/06 215/222 |
| 5,072,971 | A | | 12/1991 | Roman | |
| 5,960,819 | A | | 10/1999 | Weissinger | |
| 6,039,594 | A | | 3/2000 | Zuppa | |
| 8,056,751 | B2 | | 11/2011 | Vovan | |
| 8,424,705 | B2 | * | 4/2013 | Palmer ................... | G01D 11/26 220/302 |

(Continued)

FOREIGN PATENT DOCUMENTS

| CN | 104 405 871 A | 3/2015 |
|---|---|---|
| CN | 206049374 | 3/2017 |

(Continued)

OTHER PUBLICATIONS

International Search Report and Written Opinion, dated Apr. 1, 2020, in connection with PCT/US2019/063487, filed Nov. 27, 2019.

*Primary Examiner* — Kelsey E Cary
(74) *Attorney, Agent, or Firm* — Fay Sharpe LLP

(57) ABSTRACT

A fastener-less valve cover plate assembly that can be used to enclose a pressure chamber, such as a valve chamber of a relay valve. Installation of the components of the fastener-less valve cover plate assembly is simplified as compared to prior art cover plates utilizing fasteners, while still providing suitable performance. In addition, the fastener-less valve cover plate assembly is not readily disassembled with common tools thereby discouraging tampering.

23 Claims, 14 Drawing Sheets

(56) References Cited

U.S. PATENT DOCUMENTS

| | | | |
|---|---|---|---|
| 8,857,638 B2* | 10/2014 | Brozell | B65D 50/041 |
| | | | 215/220 |
| 2002/0090277 A1* | 7/2002 | LeVey | F16B 37/042 |
| | | | 411/172 |
| 2007/0062900 A1* | 3/2007 | Manera | B65D 41/06 |
| | | | 215/222 |
| 2008/0053949 A1* | 3/2008 | Farrar | B65D 41/065 |
| | | | 215/332 |
| 2011/0056948 A1* | 3/2011 | Brennan | B65D 51/18 |
| | | | 220/301 |
| 2011/0148107 A1 | 6/2011 | Blivet | |
| 2013/0004940 A1* | 1/2013 | Hu | A61B 10/0096 |
| | | | 435/5 |
| 2016/0087365 A1 | 3/2016 | Ohkubo et al. | |
| 2018/0266606 A1 | 9/2018 | Meister et al. | |

FOREIGN PATENT DOCUMENTS

| | | |
|---|---|---|
| DE | 202013004176 U1 | 9/2014 |
| EP | 2311672 B1 | 4/2011 |
| EP | 2463569 A1 | 6/2012 |
| EP | 2574503 A1 | 4/2013 |
| EP | 1934512 B1 | 5/2013 |
| EP | 2 990 621 A1 | 3/2016 |
| EP | 2564473 B1 | 7/2017 |
| FR | 2 308 040 A1 | 11/1976 |

* cited by examiner

DETAIL A

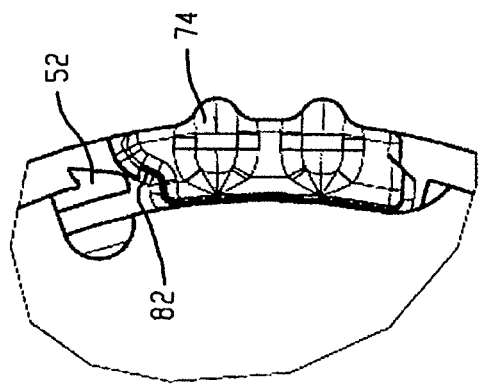
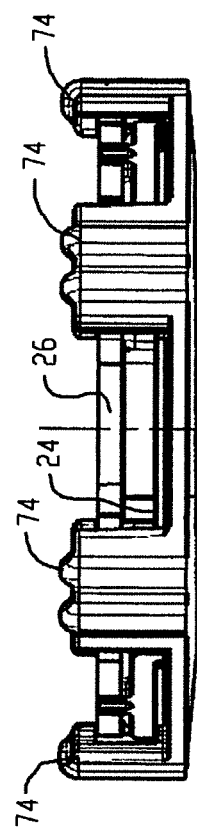
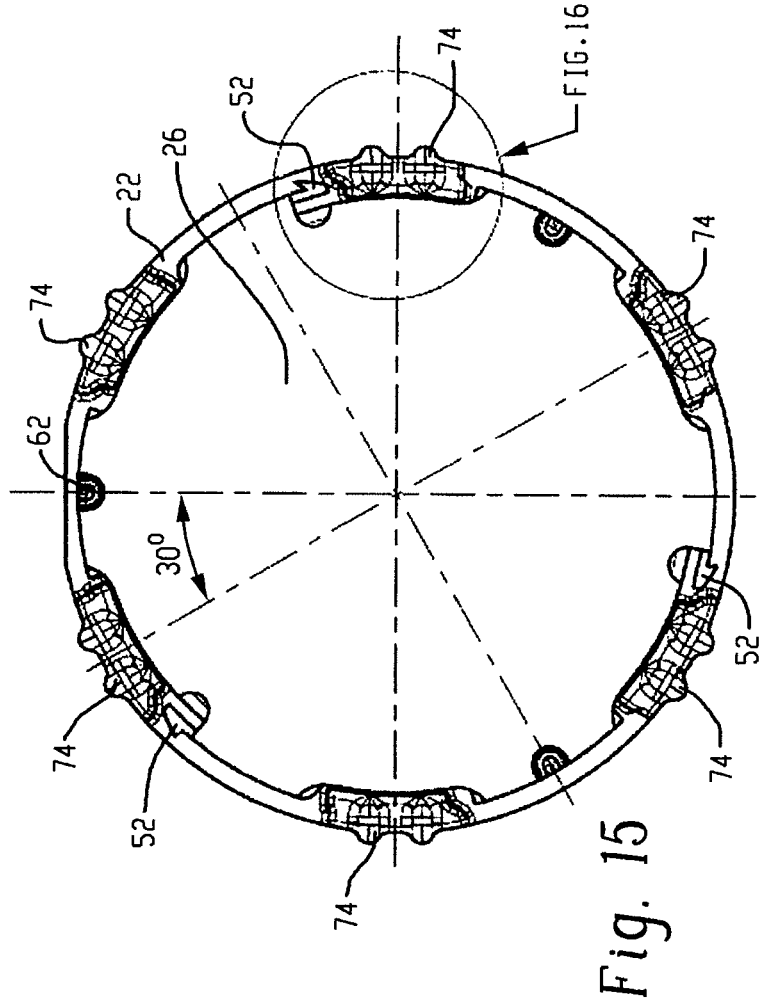

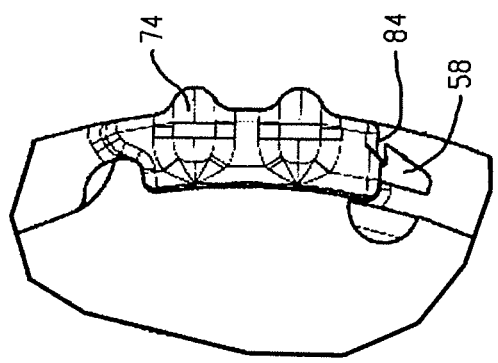
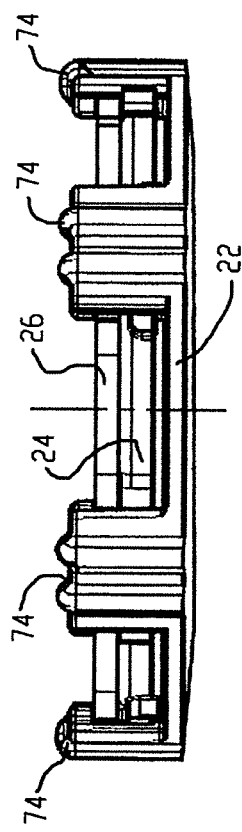
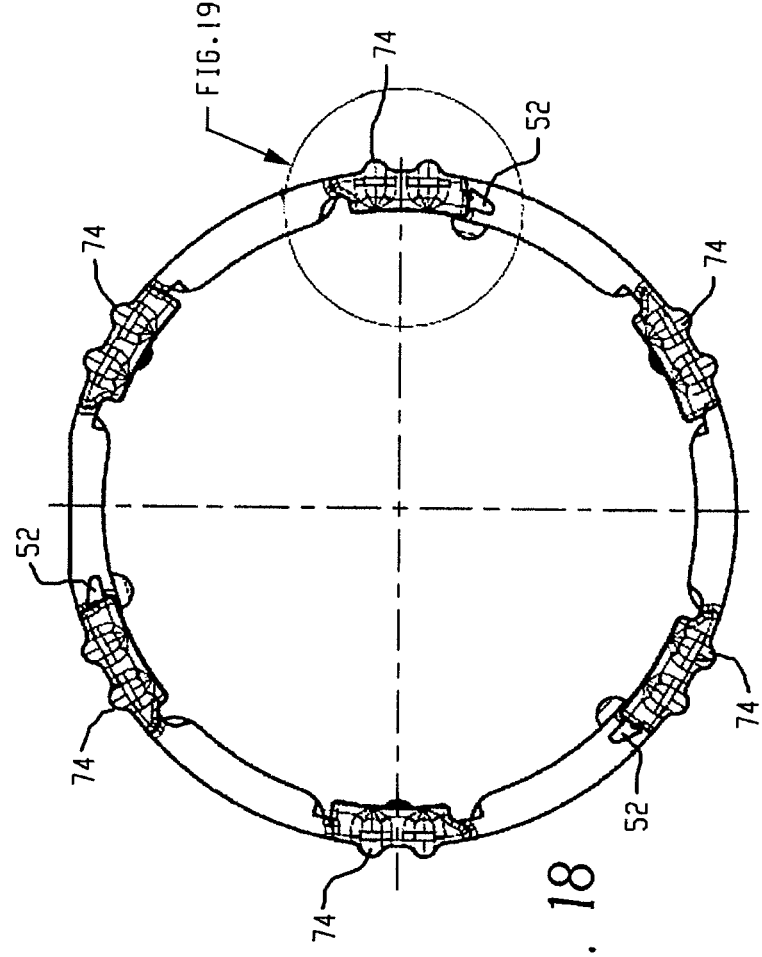

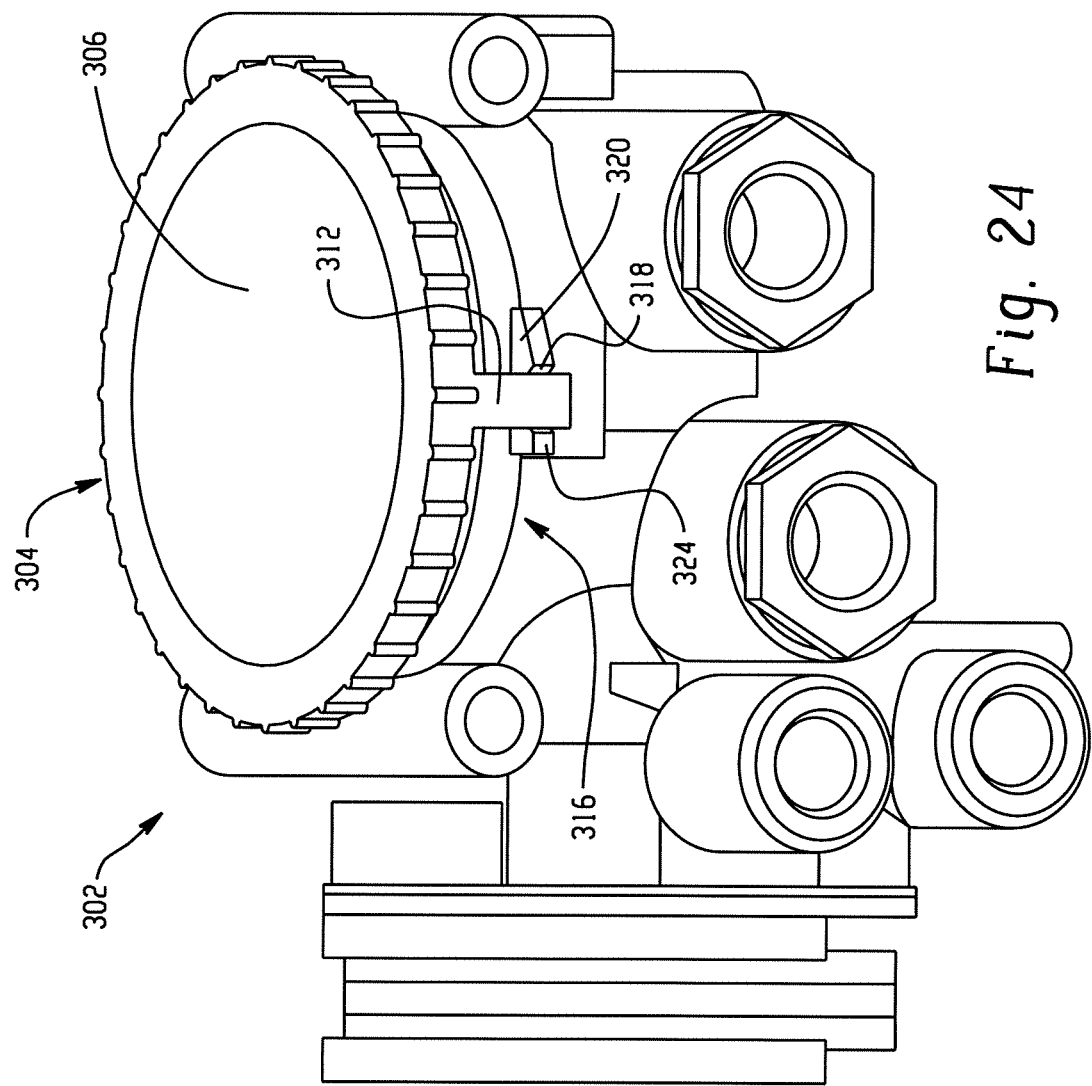

PNEUMATIC VALVE/PRESSURE VESSEL PLASTIC METAL COMPOSITE COVER WITH BAYONET RETENTION FEATURE

BACKGROUND

The present exemplary embodiments relate to closure assemblies for pressure vessels and, more particularly, closure assemblies for valve pressure chambers. However, it is to be appreciated that the present exemplary embodiment is also amenable to other like applications.

Typical relay valves generally comprise a main valve housing or body having a chamber for supporting one or more pistons and/or springs, valve members, and/or other valve components. The main housing also typically includes several ports for connecting the chamber to and from pressure supply lines.

FIG. 1 illustrates an exemplary prior art relay valve 10 having a valve body 12 with a number of ports 14. The valve body 12 defines an interior chamber in which is supported various valve components (pistons, valve members, springs, etc.), which are not shown in FIG. 1. The internal chamber is closed by cover plate 16 which is secured to the valve body 12 by four bolts 18.

Assembly of the prior art relay valve 10 is generally performed by installing the valve components into the valve body 12 and subsequently enclosing the internal chamber with the cover plate 16 by installing and torqueing bolts 18 to a specified torque setting. As the interior chamber of the relay valve 10 is pressurized, the cover plate 16 and bolts 18 are designed so as to be able to accommodate typical pressures experienced within the internal chamber of the relay valve 10. To this end, it will be understood that the selection of and the installation (e.g., torqueing) of bolts 18 is critical to maintain a sealed internal chamber throughout the range of working pressures.

While prior art relay valves have provided suitable performance, assembly of such valves and, in particular the mounting and securing of the cover plate 16 to the valve body 12 in a suitable manner to ensure proper performance, is tedious as it requires handling multiple components (bolts, washers, etc.) and torqueing the fasteners to specification.

BRIEF DESCRIPTION

The present disclosure sets forth a fastener-less valve cover plate assembly that can be used to enclose a pressure chamber, such as a valve chamber of a relay valve. Installation of the components of the fastener-less valve cover plate assembly is simplified as compared to prior art cover plates utilizing fasteners, while still providing suitable performance. In addition, the fastener-less valve cover plate assembly is not readily disassembled with common tools thereby discouraging tampering.

In accordance with one aspect of the present disclosure a cover plate assembly for a closing a pressure chamber of a valve assembly comprises a housing having a central aperture and a plurality of circumferentially spaced retention flanges surrounding the aperture, each retention flange extending in an axial direction and having a slot opening radially inwardly, and a cover having a central portion for covering the aperture and at least one anti-rotation feature adapted to engage an adjacent retention flange when the cover is rotated from an unlocked position to a locked position to restrict return rotation of the cover to the unlocked position.

The assembly can include a reinforcement member rotational interlocked with the cover. At least a portion of the reinforcement member can be received in the slot of each retention flange when the cover is in the locked position thereby restricting axial movement of the cover relative to the housing, and the anti-rotation feature secures the cover and the reinforcement member in the locked position by restricting rotation of the cover to the unlocked position when the anti-rotation feature is engaged with the adjacent retention flange.

The anti-rotation feature can include a cantilevered arm extending in spaced relation to an outer circumferential edge of the central portion of the cover, the cantilevered arm adapted to resilient deflect radially inwardly when the cover is rotated from the unlocked position to the locked position as the distal end of the cantilevered arm impinges on a first side surface of the adjacent retention flange, and to return to an undeflected state when the distal end of the cantilevered arm is rotated past the adjacent retention flange such that the distal end engages an opposite side surface of the adjacent retention flange in the locked position. The distal end of the cantilevered arm can include a barb. At least one of the distal end of the cantilevered arm or the first side surface of the adjacent retention flange can include a sloped surface having an angle to assist in urging the cantilevered arm radially inwardly. The reinforcement member can include a reinforcement plate having a plurality of lobes extending radially outwardly from a central portion of the reinforcement plate, the plurality of lobes adapted to extend radially outwardly in between adjacent retention flanges when the cover is in the unlocked position, and to be received in respective slots of the retention flanges when the cover is in the locked position. A lobe of the reinforcement plate can be angularly aligned and coextensive with a major portion of the at least one anti-rotation feature such that the lobe and the at least one anti-rotation feature are received in the slot of a common retention flange in the locked position. The cover can include a stop surface adapted to engage a surface of the housing when the assembly is in the locked position to restrict further rotation of the assembly beyond the locked position. A sealing element can be disposed between the cover and the housing for sealing the pressure chamber. The housing can include an annular groove surrounding the aperture, the sealing element being received in the annular groove. The reinforcement member can be integral with the cover.

In accordance with another aspect, a valve assembly comprises a valve housing having an internal chamber, the valve housing having a central aperture in communication with the internal chamber and a plurality of circumferentially spaced retention flanges surrounding the aperture, each retention flange extending in an axial direction and having a slot opening radially inwardly, and a cover having a central portion for covering the aperture and at least one anti-rotation feature adapted to engage an adjacent retention flange when the cover is rotated from an unlocked position to a locked position to restrict return rotation of the cover to the unlocked position.

The assembly can further include a reinforcement member rotational interlocked with the cover. At least a portion of the reinforcement member can be received in the slot of each retention flange when the cover is in the locked position thereby restricting axial movement of the cover relative to the housing, and the anti-rotation feature secures the cover and the reinforcement member in the locked position by restricting rotation of the cover to the unlocked position when the anti-rotation feature is engaged with the adjacent retention flange.

According to another aspect, a method of assembling a cover plate assembly for a closing a pressure chamber of a valve assembly comprises providing a housing having a central aperture and a plurality of circumferentially spaced retention flanges surrounding the aperture, each retention flange extending in an axial direction and having a slot opening radially inwardly, providing a cover having a central portion for covering the aperture and at least one anti-rotation feature adapted to engage an adjacent retention flange when the cover is rotated from an unlocked position to a locked position to restrict return rotation of the cover to the unlocked position, nesting the cover in the housing in a first orientation, and rotating the cover to a second orientation.

The method can further include providing a reinforcement member rotational interlocked with the cover, where at least a portion of the reinforcement member is received in the slot of each retention flange thereby restricting axial movement of the cover relative to the housing and the anti-rotation feature secures the cover and the reinforcement member in the second position by restricting rotation of the cover to the first position.

In accordance with another aspect of the present disclosure, a cover plate assembly for a closing a pressure chamber of a valve assembly comprises a housing having a central aperture, a cover having a central portion for covering the aperture, a reinforcement member rotational interlocked with the cover, and a fastener-less coupling means for restricting axial and rotational movement of the cover relative to the housing.

BRIEF DESCRIPTION OF THE DRAWINGS

FIG. 14 is a side elevational view of the exemplary valve cover plate assembly in an unlocked position;

FIG. 15 is a plan view of the exemplary valve cover plate assembly in an unlocked position;

FIG. 16 is an enlarged portion of FIG. 15;

FIG. 17 is a side elevational view of the exemplary valve cover plate assembly in a locked position;

FIG. 18 is a plan view of the exemplary valve cover plate assembly in an unlocked position;

FIG. 19 is an enlarged portion of FIG. 18;

FIG. 24 is a perspective view of a valve including a valve cover plate assembly and a protective cap.

DETAILED DESCRIPTION

Figure 1:
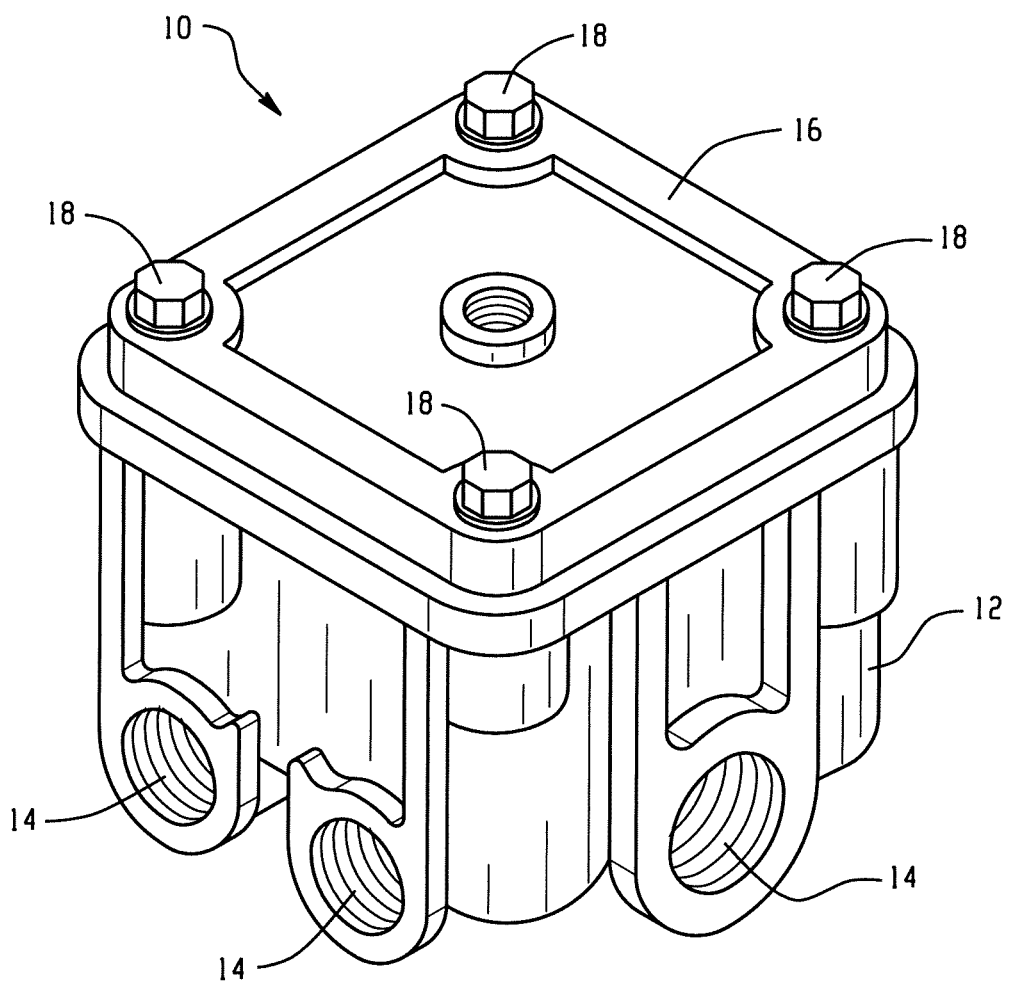
FIG. 1 is a perspective view of a prior art relay valve.
Figure 2:
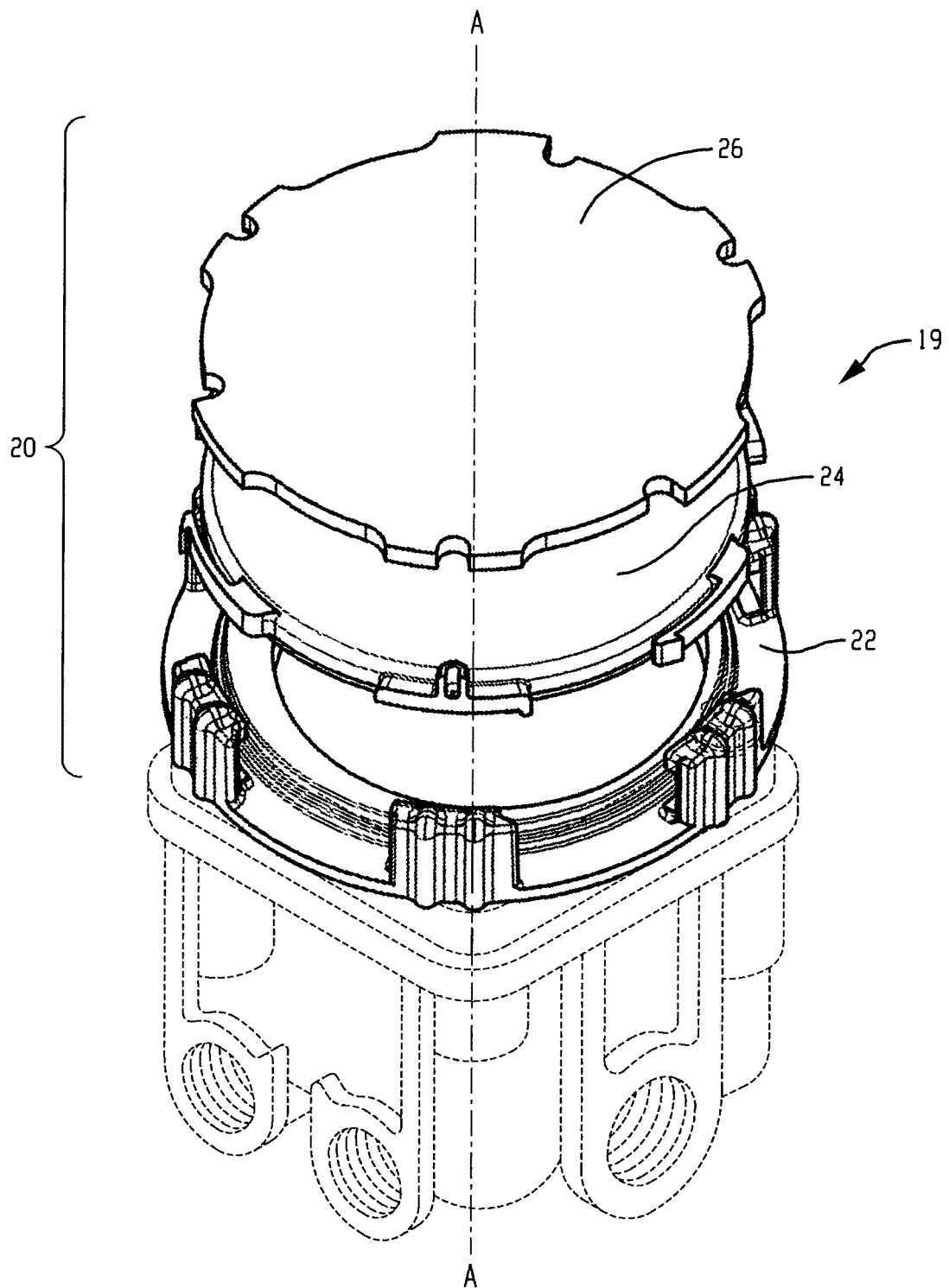
FIG. 2 is a perspective exploded view of a valve cover plate assembly of a valve in accordance with the present disclosure.
Figure 3:
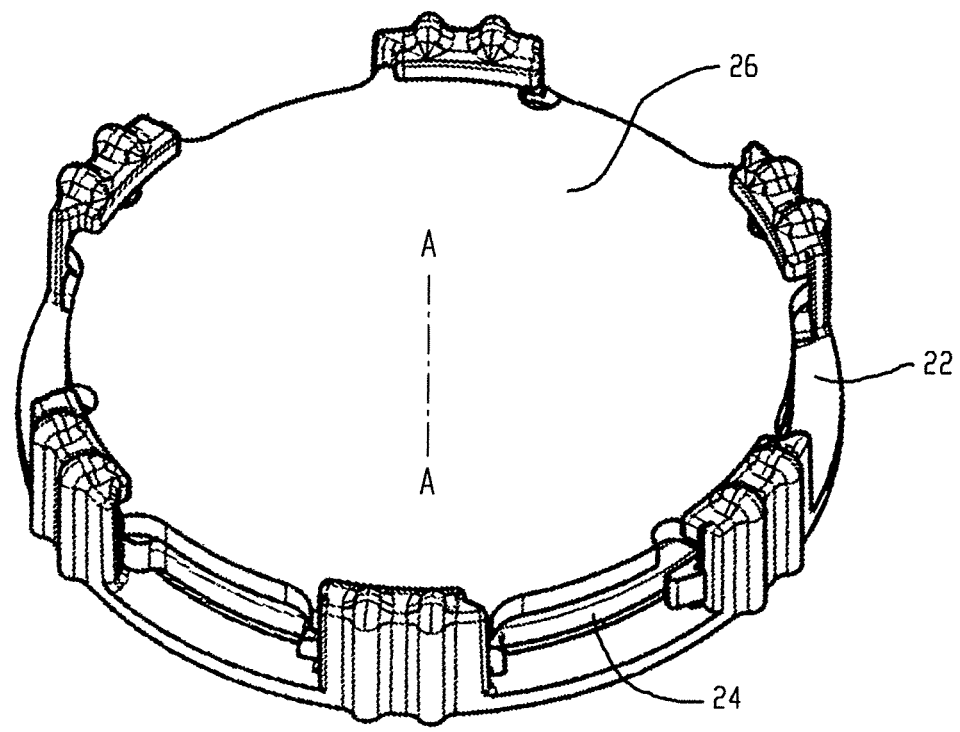
FIG. 3 is a perspective view of the exemplary valve cover plate assembly in a locked position.
Figure 4:
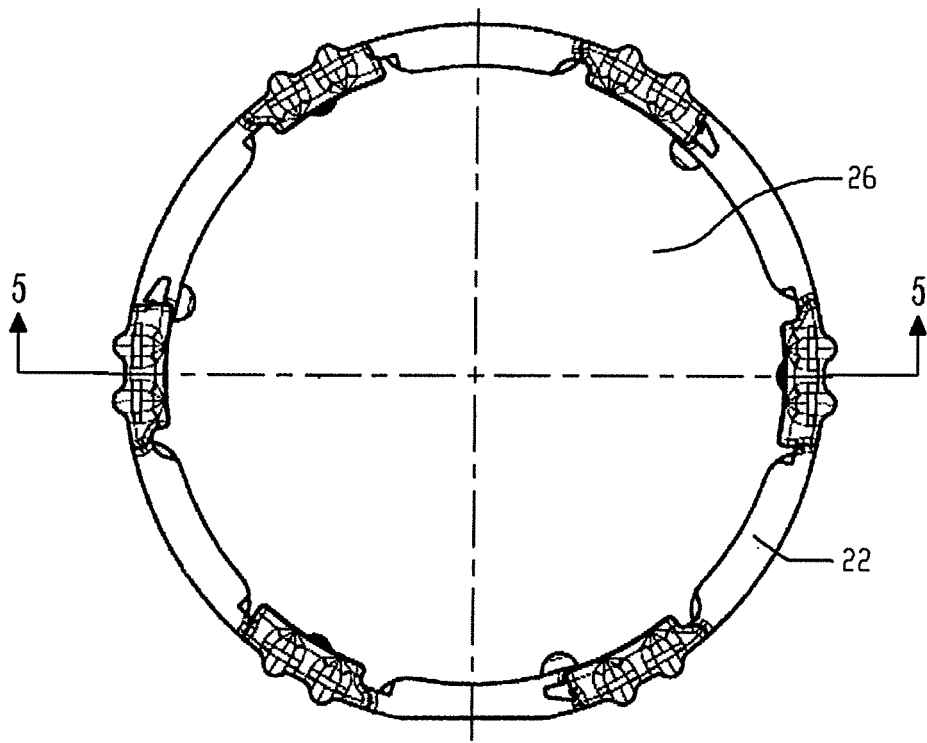
FIG. 4 is a plan view of the exemplary valve cover plate assembly in a locked position.
Figure 5:
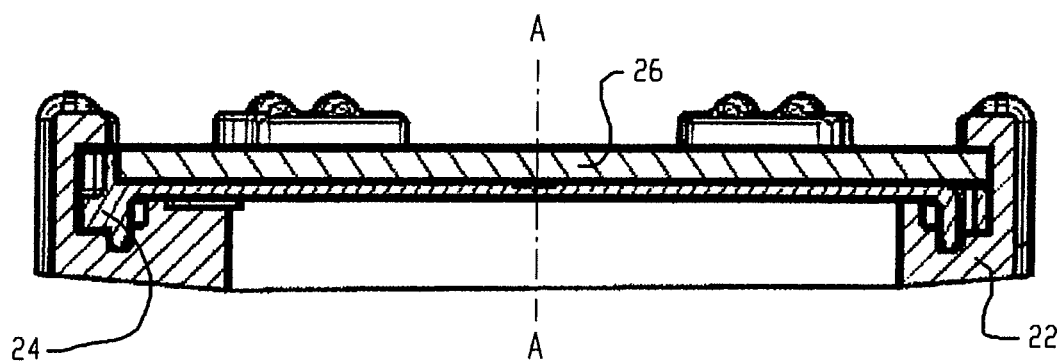
FIG. 5 is a cross-sectional view of the exemplary valve cover plate assembly taken through line 5-5 in FIG. 4.
Figure 6:
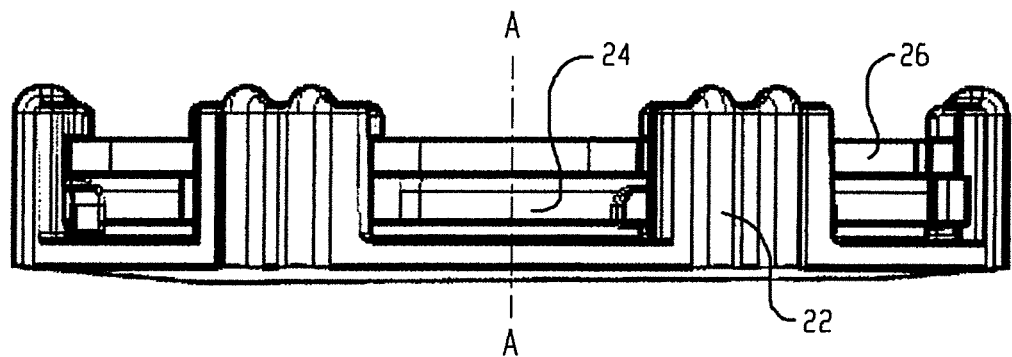
FIG. 6 is a side elevational view of the exemplary valve cover plate assembly in a locked position.

Turning now to the drawings in detail and initially to FIG. 2, an exemplary valve 19 having a valve cover plate assembly 20 in accordance with the present disclosure is illustrated. The valve cover plate assembly 20 generally comprises three components—a housing 22, a cover 24 and a reinforcement plate 26. In FIG. 2, the valve cover plate assembly 20 is illustrated integrated into a valve housing 21, but in the following figures the housing 21 is omitted for clarity. It should be appreciated, and will become readily apparent from the following disclosure, that the valve cover plate assembly 20 can be used to enclose an internal pressure chamber of a wide variety of relay valves. In addition, the valve cover plate assembly 20 can be used in a wide range of applications for enclosing internal pressure chambers of other types of valves and devices. As such, although the valve cover plate assembly 20 is shown and described in the present disclosure in connection with a relay valve, it will be appreciated that the valve cover plate assembly 20 is not limited to relay valve applications.

With additional reference to FIGS. 3-6, which all show the valve cover plate assembly 20 in an installed configuration (i.e. a locked position), it can be seen that the three components of the valve cover plate assembly 20 cooperate to restrict rotation about central axis A as well as to restrict axial movement along the central axis A. Central axis A extends along the axial direction of the valve cover plate assembly 20. As such, the terms "radial", "circumferential", and other such terminology are to be understood to be in relation to central axis A.

While the complete details of each of the housing 22, cover 24 and reinforcement plate 26 will be described below, it should be appreciated at this point that the basic assembly of the components includes rotationally interlocking the reinforcement plate 26 to the cover 24, inserting (e.g., nesting) both components into the housing 22 in an unlocked position, and rotating both components from the unlocked position to the locked position shown in FIGS. 3-6. In the locked position, a rotation lock feature of the cover 24 prevents rotation of the cover 24 and plate 26 relative to the housing 22, while portions of the reinforcement plate 26 are trapped by a plurality of retention flanges of the housing 22 thereby restricting axial displacement of the reinforcement plate 26 relative to the housing 22.

With this understanding of the basic features and operation of the valve cover plate assembly 20 in mind, the details of the rotation lock feature as well as the manner in which axial displacement of the cover 24 and reinforcement plate 26 is restricted will be described.

Figure 7:
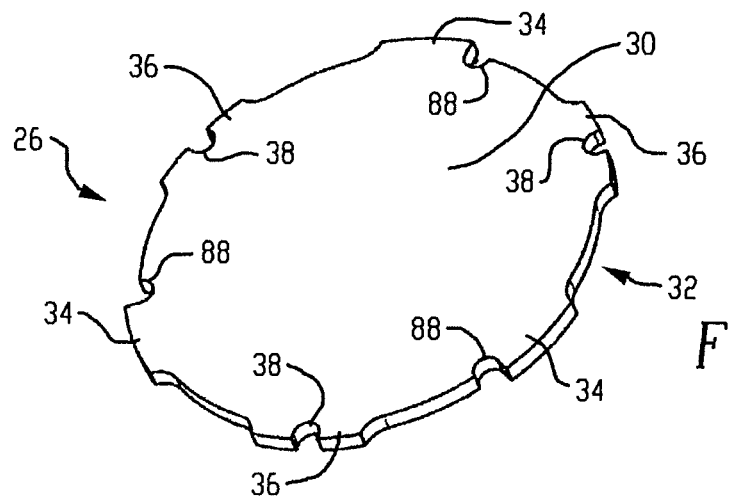
FIG. 7 is a perspective view of a reinforcement plate of the valve cover plate assembly.

In FIG. 7, the reinforcement plate 26 is illustrated. The reinforcement plate 26 generally comprises a planar body 30 which is typically made of metal, carbon fiber or any other suitable reinforcement material. In most applications, metal is a suitable material for the reinforcement plate, but any material capable of providing sufficient reinforcement to the cover 24 can be used. In some applications, the reinforcement plate 26 can be a stamped metal component. Although the illustrated reinforcement plate 26 is planar, in some applications reinforcement structures (e.g., ribs) can be provided on one or more surfaces of the reinforcement plate 26 to further enhance its strength/rigidity. In some examples, the reinforcement plate can be integral with the cover (e.g., reinforcement member overmolded with cover).

The planar body 30 has a generally cylindrical shape with a contoured outer peripheral edge 32. The various protrusions and recesses of the contoured edge 32 cooperate with certain features of both the housing 22 and the cover 24 to both rotationally and axially interlock the reinforcement plate 26 with the housing 22. To this end, the planar body 30 includes a first set of three radially outwardly extending lobes 34. Each of the lobes 34 have a generally smooth radially outer circumferential surface and are spaced approximately 120° apart from each other. A second set of three radially outwardly extending lobes 36 are positioned between lobes 34. Lobes 36 are spaced approximately 120° from each other and, unlike lobes 34, have a recess 38 in a radially outer surface thereof. Although three lobes 34 and three lobes 36 are shown, certain applications can have fewer or more lobes as desired.

Figure 8:
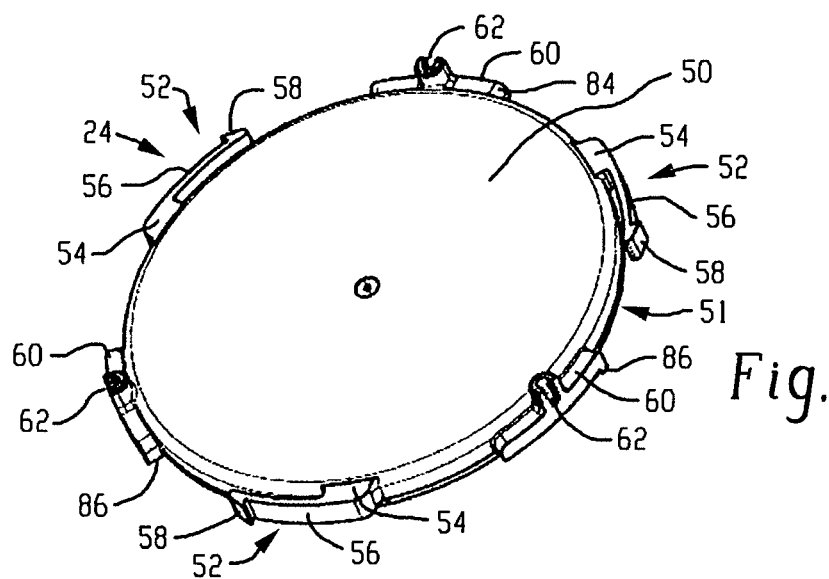
FIG. 8 is a perspective view of a cover of the valve cover plate assembly.

FIG. 8 illustrates the cover 24. The cover 24 is typically made of plastic or other composite material, such as through a molding process. The cover 24 generally comprises a generally circular central planar body portion 50 having a circumferential outer edge 51. Extending from the central planar body 50 are three snap arms 52 (e.g., anti-rotation features). Each snap arm 52 includes a base portion 54 that extends radially outwardly from the circumferentially outer surface 51 of the central planar body portion 50 and a cantilevered arm that extends circumferentially from the base portion 54 in spaced apart fashion from the circumferentially outer surface 51 of the central planar body portion 50. A distal end of the cantilevered arm 56 of each snap arm 52 includes a barb 58. The distal ends of the snap arms 52 are configured to resiliently deflect radially inwardly during installation, as will be described below.

Between each of the snap arms 52 are radially outwardly extending flanges 60 that extend beyond the circumferential outer surface 51 of the planar body portion 50. Each flange 60 includes a protrusion 62 extending axially from the flange 60. The protrusion 62 in the illustrated embodiment has a general u-shape opening to an outer circumferential side of the cover 24. When the valve cover plate assembly 20 is assembled, the protrusions 62 are configured to interlock with recesses 38 in the reinforcement plate 26 to rationally interlock the components together.

Figure 9:
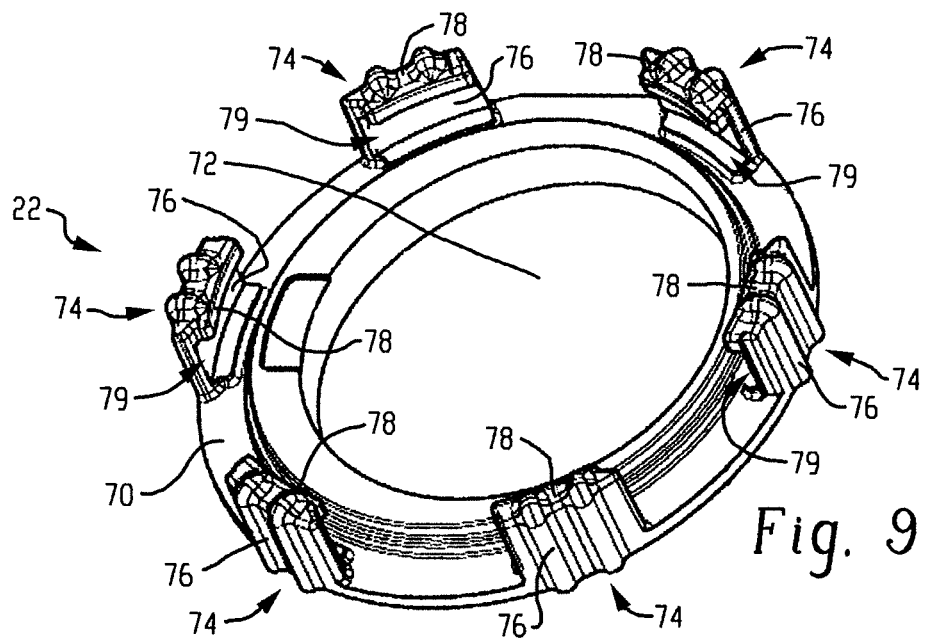
FIG. 9 is a perspective view of a housing of the valve cover plate assembly.
Figure 10:
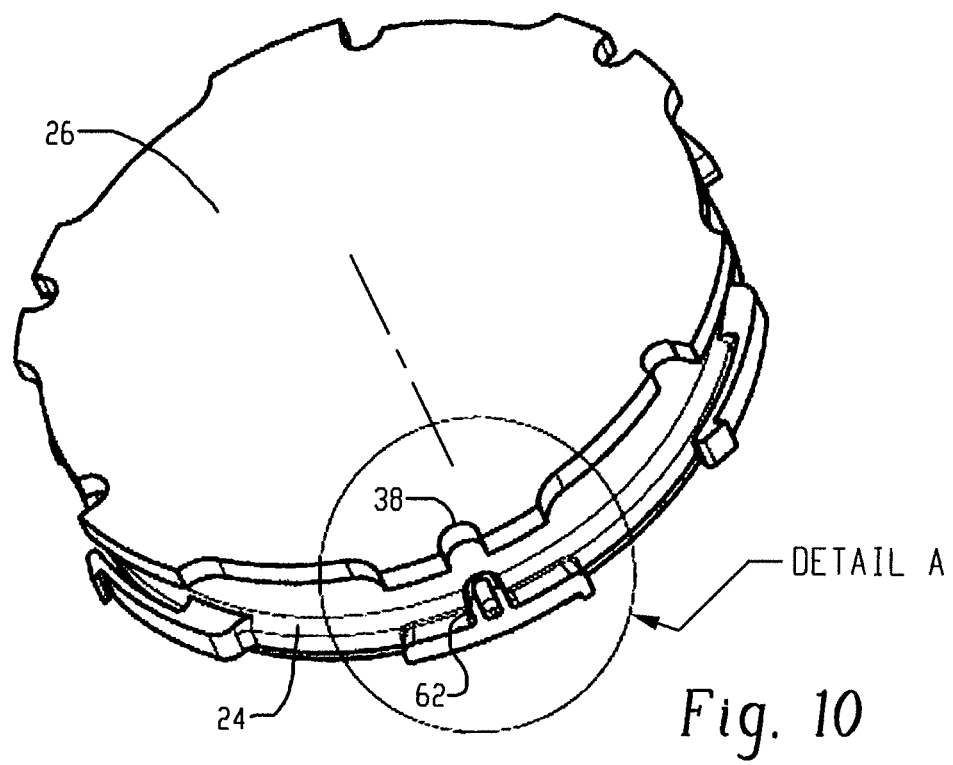
FIG. 10 is a perspective view of the reinforcement plate and cover prior to rotational interlock.
Figure 11:
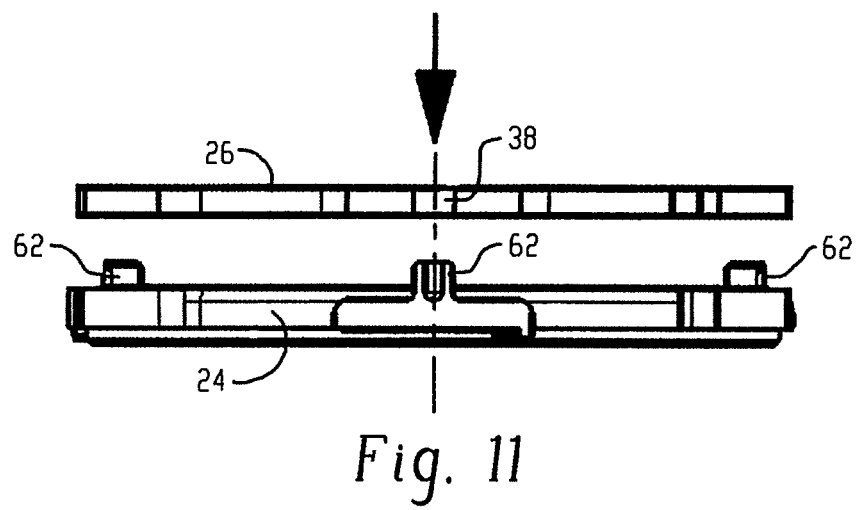
FIG. 11 is a side elevational view of the reinforcement plate and cover of FIG. 10.

Turning to FIG. 9, the housing 22 is illustrated. The housing 22 has a generally annular body 70 and is typically composed of a rigid material such as aluminum or other metal alloy, etc. Although in the illustrated embodiment the annular body 70 is shown as a separate component mountable to a valve housing, it will be appreciated that the annular body 70 may typically be formed integrally with a portion of a valve (e.g., a valve housing). The annular body 70 has a central opening or aperture 72 which, of course, is closed by the cover 24 and reinforcement plate 26 as shown in FIGS. 2-6.

Extending axially from a peripheral edge portion of the annular body 70 are a plurality of circumferentially spaced retention flanges 74. Each retention flange 74 has an axially extending base portion 76 and a radially inwardly extending flange portion 78 together defining a slot 79 opening radially inwardly (e.g., towards the center of the aperture 72). When the valve cover plate assembly 20 is assembled in the locked position, the slots 79 of the retention flanges 74 are configured to receive respective lobes 34 and 36 of the reinforcement plate 22 to restrict axial movement of the reinforcement plate 26 and cover 24, while each snap arm 52 of the cover 24 engages a side surface of a respective adjacent retention flange 74 to restrict rotation of the cover 24 and the reinforcement plate 26 from the locked position.

With reference now to FIGS. 10-19, the assembly of the valve cover plate assembly 20 will be described. With initial reference to FIGS. 10-13, it can be seen that the reinforcement plate 26 is coupled with the cover 24 such that protrusions 62 extend into recesses 38 thereby rotationally interlocking the reinforcement plate 26 with the cover 24. Coupling the cover 24 and reinforcement plate 26 in this manner is generally performed by bringing the components together along the central axis A. In some embodiments, one or more retention features can be provided to temporarily couple and retain the reinforcement plate 26 with the cover 24 prior to final assembly with the housing 22.

Figure 12:
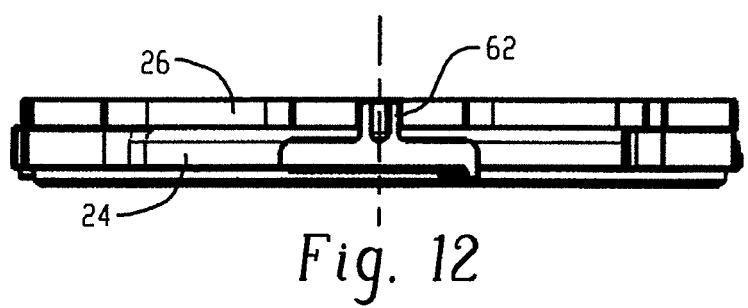
FIG. 12 is a side elevational view of the reinforcement plate and cover rotationally interlocked.
Figure 13:
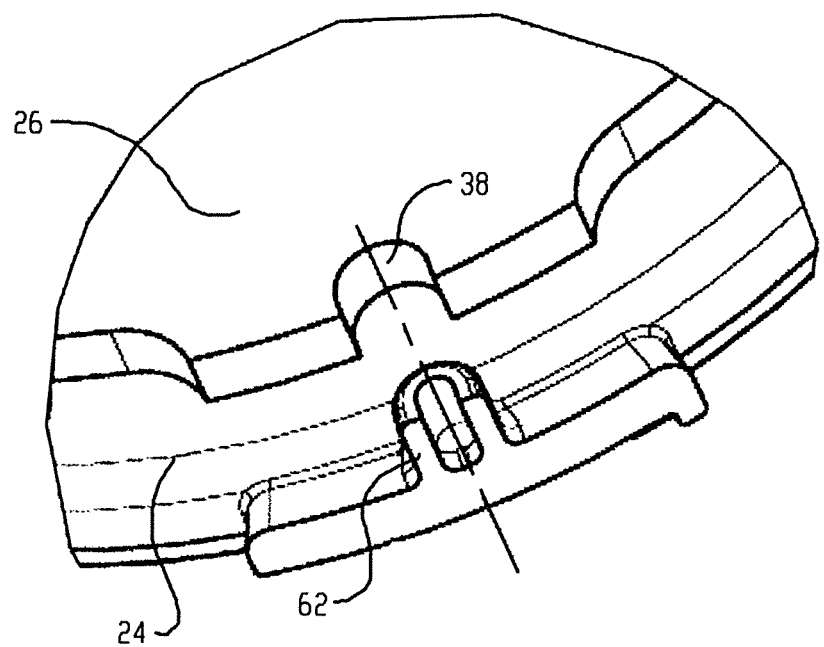
FIG. 13 is an enlarged portion of FIG. 10.

Once the reinforcement plate 26 and cover 24 are brought together to the position shown in FIG. 12, the combined components can then be positioned relative to the housing 22 and rotationally oriented such that each of the lobes 34 and the lobes 36 are received between respective adjacent retention flanges 74 of the housing 22. Orienting the combined cover 24 and reinforcement plate 26 in this fashion permits the reinforcement plate 26 and cover 24 to be fully axially seated (e.g., nested) against the annular body 70 of the housing 22, for example, as shown in FIGS. 14-16. This position is referred to herein as the unlocked position.

In the unlocked position, the angular orientation of the cover 24 is such that the barb 58 of each snap arm 52 is in a position where clockwise rotation of the combined cover 24 and reinforcement plate 26 causes a leading edge of the barb 58 to impinge upon a ramped surface 82 of an adjacent retention flange 74 (see FIG. 16) resulting in a radially inward deflection of the cantilevered arm 56. Each of the six retention flanges 74 include a ramped side surface 82 such that regardless of the orientations of the combined cover 24 and reinforcement portion 26 when nested, each of the three snap arms 52 will be positioned adjacent a ramped surface 82 of an adjacent retention flange 74.

Continued clockwise rotation of the combined cover 24 and reinforcement plate 26 causes the barb 58 of each snap arm 52 to rotate past its adjacent retention flange 74 such that the cantilevered arm 56 is no longer urged radially inwardly and returns to its relaxed state. This position is referred to herein as the locked position. In the locked position, barb 58 of each snap arm 52 engages an opposite side surface 84 of its adjacent retention flange 74 (see FIG. 19) thereby restricting return rotation of the combined cover 24 and reinforcement plate 26 (e.g., counterclockwise rotation).

It should be appreciated that once the combined cover 24 and reinforcement plate 26 is rotated to the locked position of FIGS. 17-19, continued clockwise rotation of the combined cover 24 and reinforcement plate 26 is prevented by a stop surface 86 (see FIG. 8) of each flange 60 of the cover 24. Accordingly, the combined cover 24 and reinforcement plate 26 is restricted from rotating in either of the clockwise or counterclockwise directions from the locked position. Further, the lobes 34 and 36 of the reinforcement plate 26 are trapped in slots 79 of the retention flanges 74 such that axial displacement of the reinforcement plate 26 and/or cover 24 is restricted. In the locked position, the snap arms 52 are largely concealed by their adjacent retention flanges 74. As such, the snap arms 52 are protected by the retention flanges from impact/damage and/or dislodging.

Various features can be provided to facilitate rotation of the combined cover 24 and reinforcement plate 26 from/between the unlocked and locked positions. In the illustrated embodiment, three notches 88 are provided in the reinforcement plate 26. The notches 88 are configured to be engaged with a tool that is designed to facilitate rotation of the reinforcement plate 26 from both the locked position shown in FIGS. 17-19 (e.g., during disassembly) as well as from the unlocked position shown in FIGS. 14-16 (e.g., during assembly). It will be appreciated that other features could be provided as desired such as a non-circular cross-sectional shape protrusion on the reinforcement plate 26 or other structure to facilitate applying sufficient torque to the reinforcement plate 26 to move between the locked and unlocked positions.

It should be noted that once assembled, the valve cover plate assembly 20 is not readily disassembled without the use of the specialized tool configured to engage the reinforcement plate 26 to facilitate counterclockwise rotation. This feature discourages tampering and/or unauthorized disassembly. To this end, the amount of force required to rotate the reinforcement plate 26 from the locked position to the unlocked position to allow removal of the cover 24 and reinforcement plate 26 from the housing 22 is at least in part a function of the shape and/or size of the barbs 58 of the snap arms 52. For example, the illustrated barbs 58 have a relatively sharp angle that is not easily dislodged from the side surface of the retention flange 74. As such, a significant torque must be applied in the counterclockwise direction before the barb 58 will dislodge. A shallower angle barb, or a smaller barb, could be used to decrease the amount of torque required to rotate the cover 24 and reinforcement plate 26 to the unlocked position. In some embodiments, the barb 58 can be configured to break off from the planar body 50 during disassembly such that the valve cover plate assembly 20 cannot be reused without a replacement cover 24.

Figure 20:
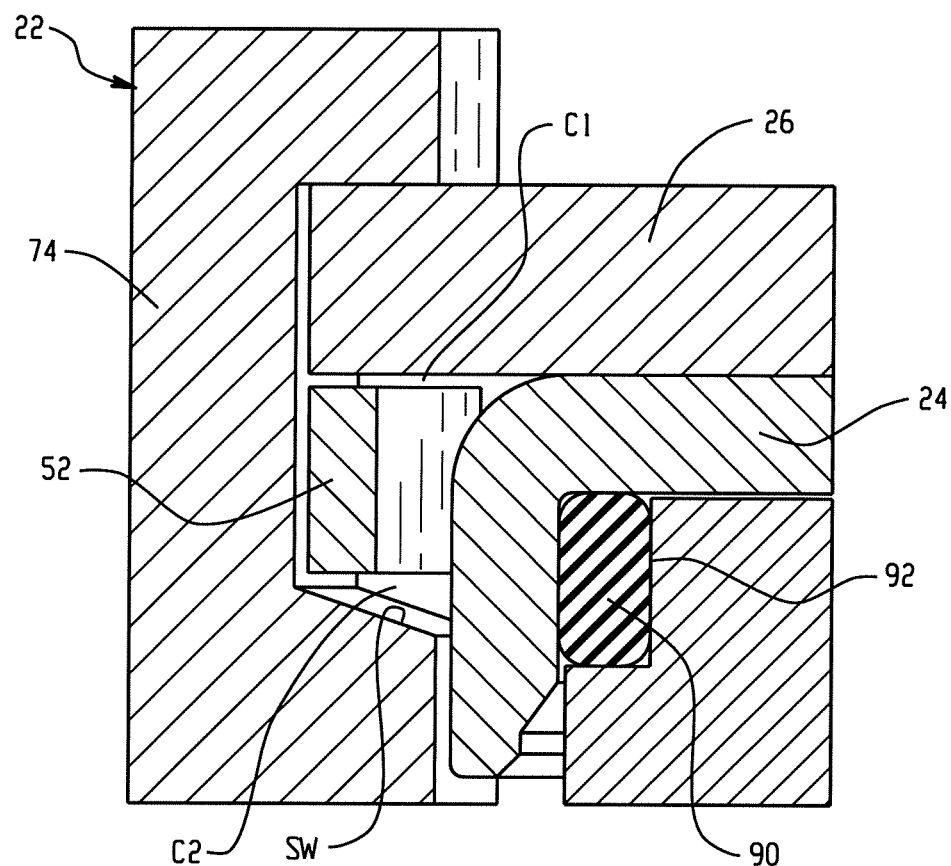
FIG. 20 is an enlarged portion of FIG. 5.

FIG. 20 shows a close-up cross-sectional view of an exemplary snap arm 52 engaged with a respective retention flange 74 of the housing 22. It should be understood that the axial thickness of the snap arm 52 is slightly less than the axial thickness of the central portion 50 of the cover 24 such that clearance C1 and C2 exist between the snap arm 52 and the housing 22 within the slot 79 on both axial sides of the snap arm 52. As such, the snap arm 52 can deflect radially inwardly, as described above, free of any interference by the housing 22. This feature allows for a smooth installation as the cover 24 is rotated from the unlocked position to the locked position. It should also be appreciated that a lower side wall SW of the slot 79 is sloped downwardly to shed moisture. Also shown in FIG. 20 is a sealing element 90 trapped in an annular groove 92 of the housing 22 by the cover 24.

Figure 21:
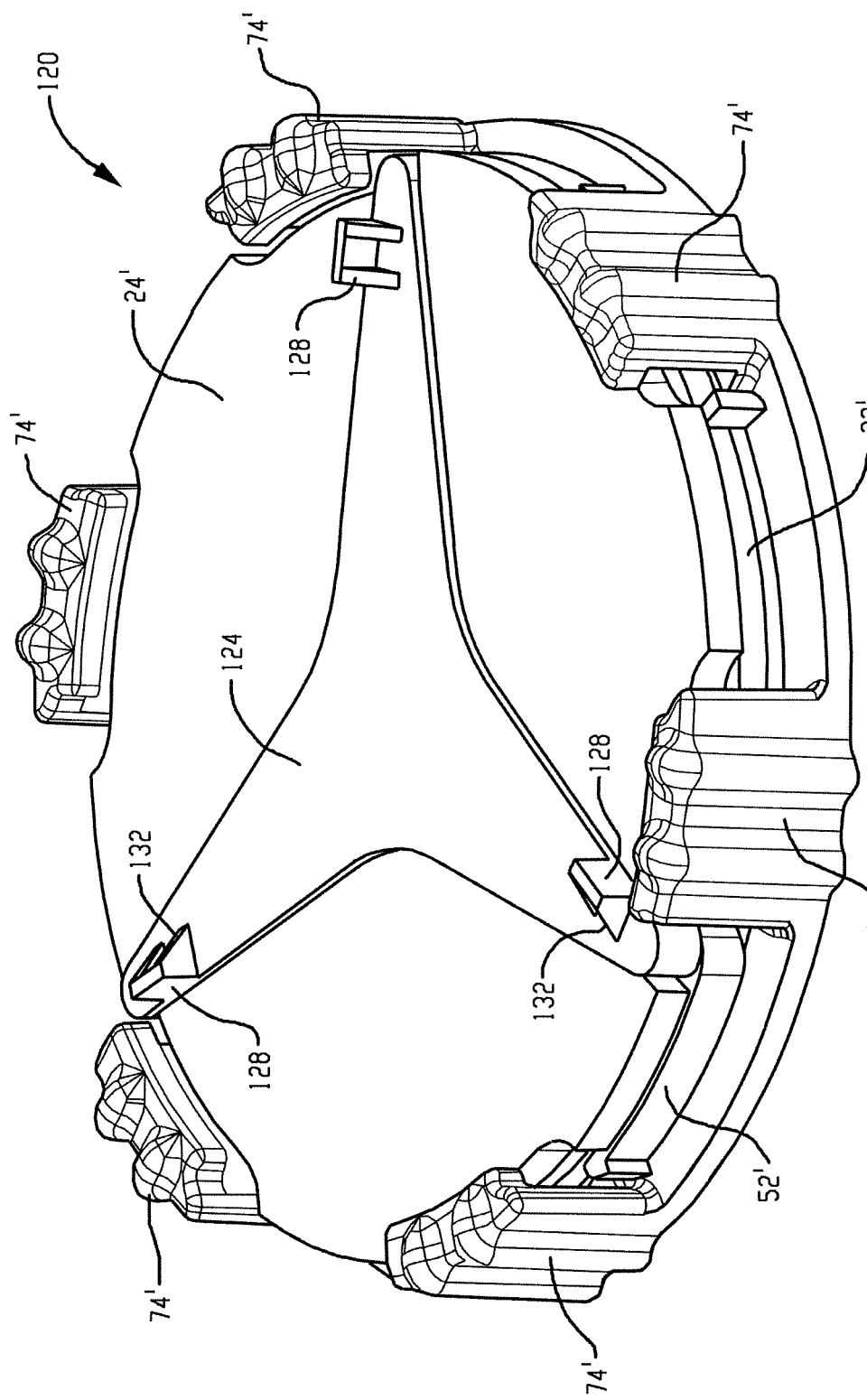
FIG. 21 is a perspective view of another exemplary valve cover plate assembly in accordance with the present disclosure.

Turning now to FIG. 21, another exemplary embodiment of a valve cover plate assembly in accordance with the present disclosure is illustrated and identified generally by reference numeral 120. This embodiment is similar in many respects to the embodiment shown and described in connection with FIGS. 2-19 with the exception being that the cover and reinforcement element are integrated into a single, unitary component. Accordingly, similar reference numerals are used with a "prime" to denote features common to both the valve cover plate assembly 120 and the valve cover plate assembly 20.

The valve cover plate assembly 120 includes a housing 22', a cover 24' and a reinforcement member 124. The reinforcement member 124 in this embodiment is integrated into the cover 24'. In some embodiments, an overmolding process can be used to integrate the reinforcement member 124 and the cover 24'. The reinforcement member 124 includes three tabs 128 to facilitate rotation of the cover 24' from the unlocked position to the locked position. As will be appreciated, the tabs 128 generally only allow the cover 24' to be easily engaged for rotation towards the locked position. Reverse rotation is not easily performed due to angled surfaces 132 of the tabs 128.

It should be appreciated that in all other respects, the valve cover plate assembly 120 is similar to the valve cover plate assembly 20 of FIGS. 2-19 and can be assembled in a similar fashion (e.g., engagement of snap arms with retention flanges, etc.)

Figure 22:
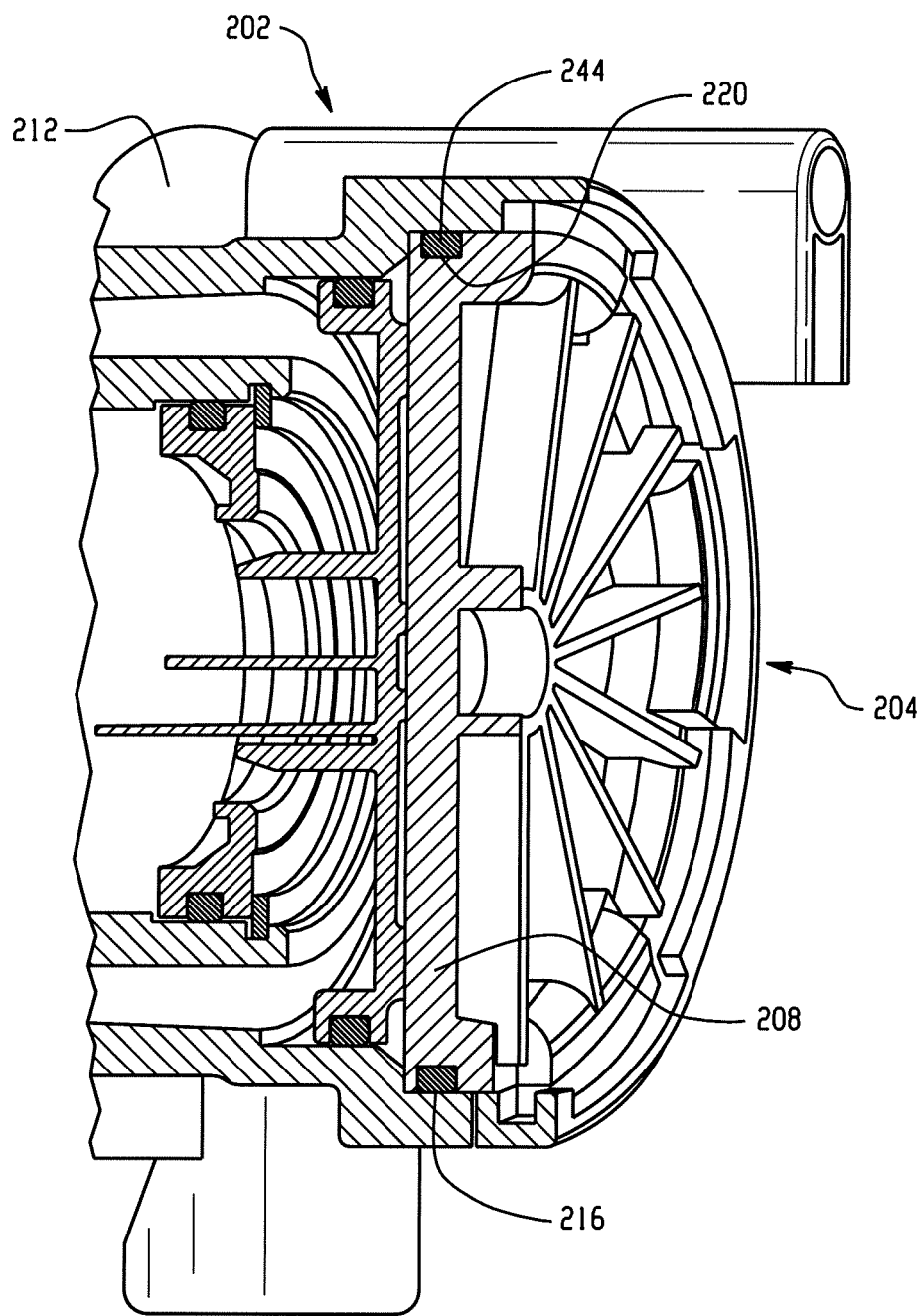
FIG. 22 is a cross-sectional view of a valve including another exemplary valve cover plate assembly in accordance with the present disclosure.

FIG. 22 shows a relay valve 202 having a snap fit cover assembly 204 in accordance with the present disclosure. In this embodiment, the snap fit cover assembly 202 generally comprises a cover 208 adapted to be received in an opening of a housing 212 of the relay valve 202. A circumferential side wall 216 of the cover 208 includes an annular groove 220 in which a sealing element 224 is disposed for sealing against a circumferential inner surface of the housing 212.

Figure 23:
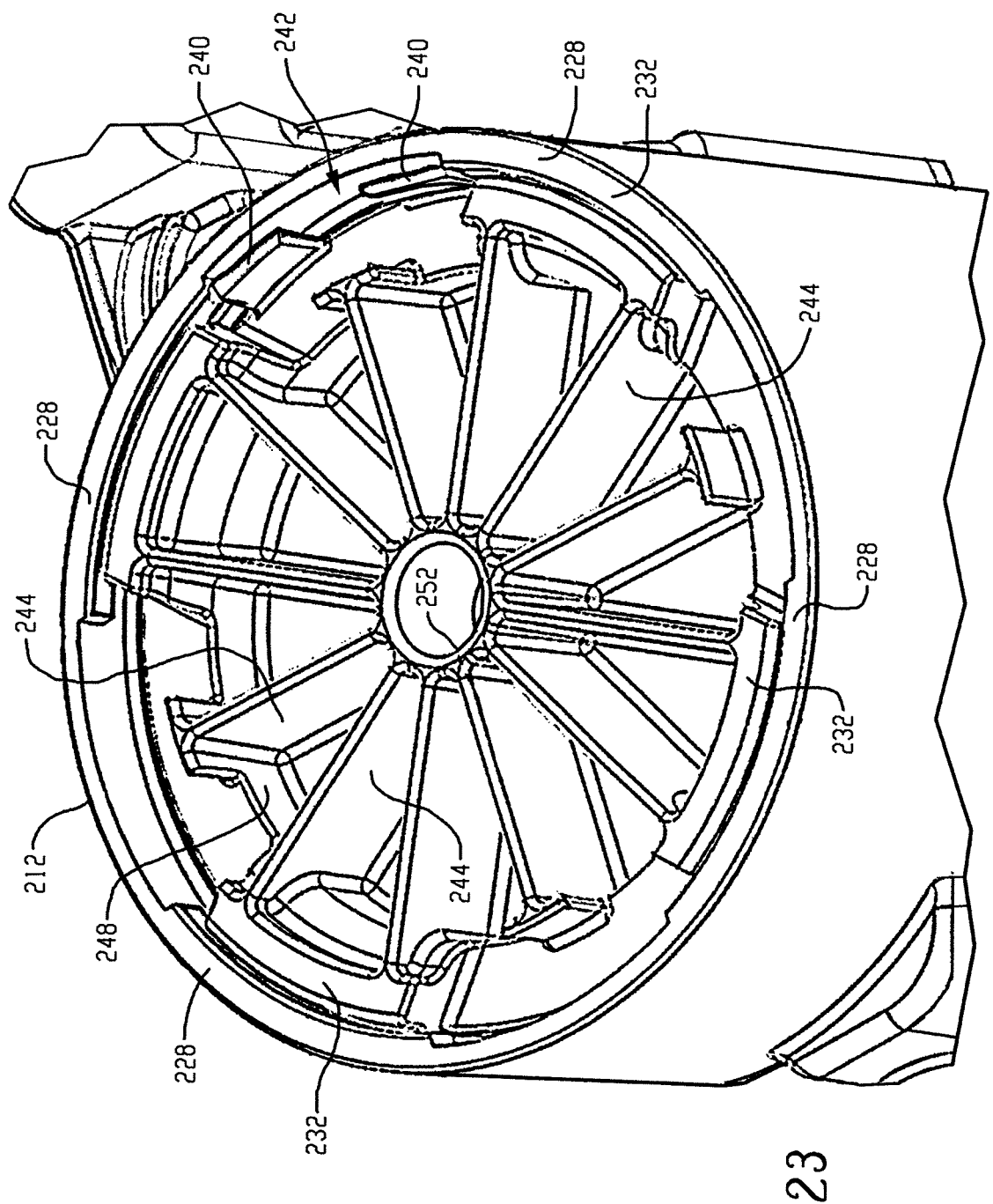
FIG. 23 is a perspective view of the valve cover plate assembly of FIG. 22.

With additional reference to FIG. 23, it will be appreciated that the housing 212 includes a plurality of retention flanges 228 while the cover 208 includes a plurality of lobes 232. As will be appreciated, the cover 208 can be nested in the housing 212 in a first angular orientation (e.g., unlocked position) and rotated to the locked position shown in FIG. 23 whereat the lobes 232 are retained by the retention flanges 228. Anti-rotation tabs 240 of the cover 208 restrict rotation of the cover 208 from the locked position. The anti-rotation tabs 240 are flexible and configured to deflect radially inwardly to clear the retention flanges 228 during installation of the cover 208. The anti-rotation tabs are configured to be received in a slot 242 between adjacent retention flanges 228 to restrict rotation of the cover 208 in either direction from the locked position.

In the embodiment of FIGS. 22 and 23, the cover 208 includes a plurality of reinforcement members in the form of ribs 244 extending between a circumferential outer sidewall 248 and a central hub 252. These reinforcement members are integrally formed as part of the cover 208 and provide the cover 208 with suitable stiffness and strength to resist typical operating pressures of the valve 202. The multiple ribs 244 and other structures of the cover 208, however, create multiple receptacles that can accumulate moisture and/or dirt when installed in a vehicle. Freezing of such accumulated moisture can damage the cover 208.

With reference to FIG. 24, relay valve 302 is shown including a cap 304 for preventing water and/or debris ingress. It will be appreciated that the cap 204 is particularly useful for use in connection with the valve cover 208 of FIGS. 22 and 23 which has multiple receptacles formed by the reinforcement ribs 244. However, it will be appreciated that the cap 304 can be used with any embodiment of the present disclosure where moisture/contaminant ingress protection is desired.

The cap 304 generally includes a main body 306 adapted to be closely received over a top of the valve cover (not shown). First and second tabs 312 extend from the main body 306 (only one tab 312 visible in FIG. 24). The tabs 312 are adapted to engage a shoulder 316 on an exterior of the valve housing 316 to retain the cap 304. Each tab 312 is received in a gap 318 between a ramp 320 and stop 324 such that rotation of the cap 304 is restricted. Ramp 320 is provided for urging the tab 312 radially outwardly when the cap 304 is rotated during installation until the tab 312 snaps into gap 318.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A cover plate assembly for closing a pressure chamber of a valve assembly comprising:
 a housing having a central aperture and a plurality of circumferentially spaced retention flanges surrounding the aperture, each retention flange extending in an axial direction and having a slot opening radially inwardly;
 a cover having a central portion for covering the aperture and at least one anti-rotation feature adapted to engage an adjacent retention flange when the cover is rotated from an unlocked position to a locked position to restrict return rotation of the cover to the unlocked position; and
 a reinforcement member rotational interlocked with the cover, wherein at least a portion of the reinforcement member is received in the slot of each retention flange when the cover is in the locked position thereby restricting axial movement of the cover relative to the housing; whereby the anti-rotation feature secures the cover and the reinforcement member in the locked position by restricting rotation of the cover to the unlocked position when the anti-rotation feature is engaged with the adjacent retention flange.

2. The cover plate assembly of claim 1, wherein the anti-rotation feature includes a cantilevered arm extending in spaced relation to an outer circumferential edge of the central portion of the cover, the cantilevered arm adapted to resilient deflect radially inwardly when the cover is rotated from the unlocked position to the locked position as a distal end of the cantilevered arm impinges on a first side surface of the adjacent retention flange, and to return to an undeflected state when the distal end of the cantilevered arm is rotated past the adjacent retention flange such that the distal end engages an opposite side surface of the adjacent retention flange in the locked position.

3. The cover plate assembly of claim 2, wherein the distal end of the cantilevered arm includes a barb.

4. The cover plate assembly of claim 2, wherein at least one of the distal end of the cantilevered arm or the first side surface of the adjacent retention flange includes a sloped surface having an angle to assist in urging the cantilevered arm radially inwardly.

5. The cover plate assembly of claim 1, wherein the reinforcing member includes a reinforcement plate having a plurality of lobes extending radially outwardly from a central portion of the reinforcement plate, the plurality of lobes adapted to extend radially outwardly in between adjacent retention flanges when the cover is in the unlocked position, and to be received in respective slots of the retention flanges when the cover is in the locked position.

6. The cover plate assembly of claim 5, wherein a lobe of the reinforcement plate is angularly aligned and coextensive with a major portion of the at least one anti-rotation feature such that the lobe and the at least one anti-rotation feature are received in the slot of a common retention flange in the locked position.

7. The cover plate assembly of claim 5, wherein the reinforcement plate includes a stop surface adapted to engage a surface of the housing when the cover is in the locked position to restrict further rotation of the cover beyond the locked position.

8. The cover plate assembly of claim 1, further comprising a sealing element disposed between the cover and the housing for sealing the pressure chamber.

9. The cover plate assembly of claim 8, wherein the housing includes an annular groove surrounding the aperture, the sealing element being received in the annular groove.

10. The cover plate assembly of claim 1, wherein the reinforcement member is integral with the cover.

11. The cover plate assembly of claim 1, wherein the retention flanges restrict axial movement of the cover relative to the housing when the cover is in the locked position.

12. A valve assembly comprising:
 a valve housing having an internal chamber, the valve housing having a central aperture in communication with the internal chamber and a plurality of circumferentially spaced retention flanges surrounding the aperture, each retention flange extending in an axial direction and having a slot opening radially inwardly;
 a cover having a central portion for covering the aperture and at least one anti-rotation feature adapted to engage an adjacent retention flange when the cover is rotated from an unlocked position to a locked position to restrict return rotation of the cover to the unlocked position; and
 a reinforcement member rotational interlocked with the cover, wherein at least a portion of the reinforcement member is received in the slot of each retention flange when the cover is in the locked position thereby restricting axial movement of the cover relative to the housing, whereby the anti-rotation feature secures the cover and the reinforcement member in the locked position by restricting rotation of the cover to the unlocked position when the anti-rotation feature is engaged with the adjacent retention flange.

13. The valve assembly of claim 12, wherein the anti-rotation feature includes a cantilevered arm extending in spaced relation to an outer circumferential edge of the central portion of the cover, the cantilevered arm adapted to resilient deflect radially inwardly when the cover is rotated from the unlocked position to the locked position as a distal end of the cantilevered arm impinges on a first side of the adjacent retention flange, and to return to an undeflected state when the distal end of the cantilevered arm is rotated past the adjacent retention flange such that the distal end engages an opposite side surface of the adjacent retention flange in the locked position.

14. The valve assembly of claim 13, wherein the distal end of the cantilevered arm includes a barb.

15. The valve assembly of claim 13, wherein at least one of the distal end of the cantilevered arm or the first side surface of the adjacent retention flange includes a sloped surface having an angle to assist in urging the cantilevered arm radially inwardly.

16. The valve assembly of claim 12, wherein the reinforcing member includes a reinforcement plate having a plurality of lobes extending radially outwardly from a central portion of the reinforcement plate, the plurality of lobes adapted to extend radially outwardly in between adjacent retention flanges when the cover is in the unlocked position, and to be received in respective slots of the retention flanges when the cover is in the locked position.

17. The valve assembly of claim 16, wherein a lobe of the reinforcement plate is angularly aligned and coextensive with a major portion of the at least one anti-rotation feature such that the lobe and the at least one anti-rotation feature are received in the slot of a common retention flange in the locked position.

18. The valve assembly of claim 16, wherein the reinforcement plate includes a stop surface adapted to engage a surface of the housing when the cover is in the locked position to restrict further rotation of the cover beyond the locked position.

19. The valve assembly of claim 12, further comprising a sealing element disposed between the cover and the housing for sealing the internal chamber.

20. The valve assembly of claim 19, wherein the housing includes an annular groove surrounding the aperture, the sealing element being received in the annular groove.

21. The valve assembly of claim 12, wherein the reinforcement member is integral with the cover.

22. The valve assembly of claim 12, wherein the retention flanges restrict axial movement of the cover relative to the housing when the cover is in the locked position.

23. A method of assembling a cover plate assembly for a closing a pressure chamber of a valve assembly comprising:
providing a housing having a central aperture and a plurality of circumferentially spaced retention flanges surrounding the aperture, each retention flange extending in an axial direction and having a slot opening radially inwardly;
providing a cover having a central portion for covering the aperture and at least one anti-rotation feature adapted to engage an adjacent retention flange when the cover is rotated from an unlocked position to a locked position to restrict return rotation of the cover to the unlocked position;
providing a reinforcement member and rotationally interlocking the cover and the reinforcing member;
nesting the cover in the housing in a first orientation; and rotating the cover to a second orientation;
wherein at least a portion of the reinforcement member is received in the slot of each retention flange thereby restricting axial movement of the cover relative to the housing and the anti-rotation feature secures the cover and the reinforcement member in the second position by restricting rotation of the cover to the first position.

* * * * *